(12) United States Patent
Zhao et al.

(10) Patent No.: US 9,243,873 B2
(45) Date of Patent: *Jan. 26, 2016

(54) BROADBAND OPTICAL LIMITER BASED ON NANO-GRAPHENE AND METHOD OF FABRICATING SAME

(75) Inventors: Wei Zhao, Little Rock, AR (US); Boshan Zhao, Little Rock, AR (US)

(73) Assignee: BOARD OF TRUSTEES OF THE UNIVERSITY OF ARKANSAS, Little Rock, AR (US)

( * ) Notice: Subject to any disclaimer, the term of this patent is extended or adjusted under 35 U.S.C. 154(b) by 946 days.

This patent is subject to a terminal disclaimer.

(21) Appl. No.: 13/176,506

(22) Filed: Jul. 5, 2011

(65) Prior Publication Data
US 2011/0304934 A1 Dec. 15, 2011

Related U.S. Application Data

(63) Continuation-in-part of application No. 12/766,309, filed on Apr. 23, 2010.

(60) Provisional application No. 61/361,082, filed on Jul. 2, 2010, provisional application No. 61/214,762, filed on Apr. 28, 2009.

(51) Int. Cl.
| | |
|---|---|
| *B32B 9/00* | (2006.01) |
| *F41H 5/00* | (2006.01) |
| *C01B 31/04* | (2006.01) |
| *B82Y 20/00* | (2011.01) |
| *F41H 13/00* | (2006.01) |
| *G02B 5/23* | (2006.01) |
| *G02F 1/35* | (2006.01) |

(Continued)

(52) U.S. Cl.
CPC . *F41H 5/00* (2013.01); *B82Y 20/00* (2013.01); *C01B 31/0438* (2013.01); *F41H 13/005* (2013.01); *G02B 5/23* (2013.01); *G02F 1/355* (2013.01); *G02F 1/3523* (2013.01); *G02F 1/3525* (2013.01); *G02B 1/06* (2013.01); *G02F 2202/36* (2013.01); *G02F 2203/52* (2013.01)

(58) Field of Classification Search
CPC .. C01B 31/04; C01B 31/0438; C01B 2204/00
USPC .............. 428/408; 423/448; 252/500, 501
See application file for complete search history.

(56) References Cited

U.S. PATENT DOCUMENTS

| | | | |
|---|---|---|---|
| 2003/0122111 A1* | 7/2003 | Glatkowski | ............ 252/500 |
| 2004/0040834 A1 | 3/2004 | Smalley et al. | |
| 2007/0116628 A1 | 5/2007 | Shew et al. | |

(Continued)

OTHER PUBLICATIONS (Optical Limiting and degenerate four wave mixing in novel fullerenes, Daniel Marciu 1999).*

(Continued)

*Primary Examiner* — Daniel H Miller
(74) *Attorney, Agent, or Firm* — Tim Tingkang Xia, Esq.; Locke Lord LLP

(57) ABSTRACT

The present invention in one aspect relates to a low-cost, nano-graphene based broadband optical limiter with limiting properties superior to current standards, carbon fullerenes ($C_{60}$) solutions and carbon black suspensions. The broadband optical limiter includes a plurality of graphene nano-sheets, and a base material in which the plurality of graphene nano-sheets is distributed. The base material can be liquid or gel matrix.

12 Claims, 4 Drawing Sheets

(51) Int. Cl.
*G02F 1/355* (2006.01)
*G02B 1/06* (2006.01)

(56) References Cited

U.S. PATENT DOCUMENTS

| | | | |
|---|---|---|---|
| 2007/0243124 A1 | 10/2007 | Baughman | |
| 2007/0284557 A1* | 12/2007 | Gruner et al. | 252/500 |
| 2009/0016199 A1 | 1/2009 | Eguro | |
| 2009/0017211 A1 | 1/2009 | Gruner et al. | |
| 2009/0059368 A1 | 3/2009 | Kamada | |
| 2009/0208743 A1 | 8/2009 | Pettit | |
| 2012/0107593 A1* | 5/2012 | Luo et al. | 428/220 |

OTHER PUBLICATIONS

Li, Q. et al., Broadband Optical Limiting and Two-photon Absorption Properties of Colloidal GaAs Nanocrystals, Opt. Exp., Mar. 21, 2005, 1833-38, 13, 6.

Boggess, Jr. T. F. et al., Simultaneous Measurement of the 2-Photon Coefficient and Free-Carrier Cross-Section above the Bandgap of Crystalline Silicon, IEEE J. Quantum Electron., Feb. 1986, 360-368, QE-22, 2.

He, G. S. et al., Multiphoton Absorbing Materials: Molecular Designs, Characterizations, and Applications, Chem. Rev., 2008, 1245-1330, 108, 4.

El-Sayed M. A., Some Interesting Properties of Metals Confined in Time and Nanometer Space of Different Shapes, Acc. Chem. Res., Apr. 2001, 257-264, 34, 4.

Niyogi et al., Solution Properties of Graphite and Graphene, J. Am. Chem. Soc., 2006, 7720-7721, 128, 24.

Yang et al., Two-Dimensional Graphene Nanoribbons, J. Am. Chem. Soc., 2008, 4216-4217, 130, 13.

Geim K., et al., "The Rise of Graphene," Nature Materials, Mar. 2007, pp. 183-191, vol. 6, Nature Publishing Group.

Xiaolin Li, et al., "Chemically Derived, Ultrasmooth Graphene Nanoribbon Semiconductors," Science, Feb. 29, 2008, pp. 1229-1232, vol. 319.

Wang F., et al., "Gate-Variable Optical Transitions in Graphene," Science, Apr. 11, 2008, pp. 206-209, vol. 320.

Lu Y. H., et al., "Tuning the Electronic Structure of Graphene by an Organic Molecule," The Journal of Physical Chemistry B, 2009, pp. 2-5, vol. 113, American Chemical Society, USA.

Dubikovskiy V., et al., "Large Nonlinear Refraction in InSb at 10 ?m and the Effects of Auger Recombination," J. Opt. Soc. Am. B, 2008, pp. 223-235, vol. 25, Optical Society of America.

Boyd R. W., et al., Nonlinear Optics, 1992, pp. 229-231, Academic Press.

Zhibo Liu, et al., "Nonlinear Optical Properties of Graphene Oxide in Nanosecond and Picosecond Regimes," Applied Physics Letters, 2009, vol. 94, American Institute of Physics.

Xu Yanfei, et al., "A Graphene Hybrid Material Covalently Functionalized with Porphyrin: Synthesis and Optical Limiting Property," Advanced Materials, 2009, pp. 1275-1279, vol. 21, WILEY-VCH Verlag GmbH & Co.

Liu Zhi-Bo, et al., "Porphyrin and Fullerene Covalently Functionalized Graphene Hybrid Materials with Large Nonlinear Optical Properties," J. Phys. Chem. B, 2009, pp. 9681-9686, vol. 113, American Chemical Society.

Zhou Yong, et al., "Hydrothermal Dehydration for the "Green" Reduction of Exfoliated Graphene Oxide to Graphene and Demonstration of Tunable Optical Limiting Properties," Chem. Mater., 2009, 2950-2956, vol. 21, American Chemical Society.

Dan Li, et al., "Processable Aqueous Dispersions of Graphene Nanosheets," Nature Nanotechnology, Feb. 2008, pp. 101-105, vol. 3, Nature Publishing Group.

Xu Yang, et al., "Double Stranded DNA—Single Walled Carbon Nanotube Hybrids for Optical Hydrogen Peroxide and Glucose Sensing," J. Phys. Chem. C., 2007, pp. 8638-8643, vol. 111, American Chemical Society.

Lide David R., et al., CRC Handbook of Chemistry and Physics (82nd Edition), 2001-2002, CRC Press.

Sajeev U.S., et al., "Control of nanostructures in PVA, PVA/chitosan blends and PCL through electrospinning," Bulletin of Material Science, Jun. 2008, pp. 343-351, vol. 31, Indian Academy of Sciences.

* cited by examiner

BROADBAND OPTICAL LIMITER BASED ON NANO-GRAPHENE AND METHOD OF FABRICATING SAME

CROSS-REFERENCE TO RELATED PATENT APPLICATION

This application claims priority to and the benefit of, pursuant to 35 U.S.C. §119(e), U.S. provisional patent application Ser. No. 61/361,082, filed Jul. 2, 2010, entitled "Broadband Optical Limiter Based on Nano-Graphene and Method of Fabricating Same," by W. Zhao et al., which is incorporated herein in its entirety by reference.

This application is also a continuation-in-part of U.S. patent application Ser. No. 12/766,309, filed Apr. 23, 2010, entitled "Broadband Optical Limiter Based on Nano-Graphene and Method of Fabricating Same," by W. Zhao et al., which itself claims priority to and the benefit of, pursuant to 35 U.S.C. §119(e), U.S. provisional patent application Ser. No. 61/214,762, filed Apr. 28, 2009, entitled "Nano-Graphene Broadband Optical Limiters," by W. Zhao et al., which are incorporated herein in their entireties by reference.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference. In terms of notation, hereinafter, "[n]" represents the nth reference cited in the reference list. For example, [10] represents the 10th reference cited in the reference list, namely, He, G. S., Tan, L.-S., Zheng, Q., Prasad, P. N. Chem. Rev. 2008, 108, 1245-1330. Multiphoton Absorbing Materials: Molecular Designs, Characterizations, and Applications.

FIELD OF THE INVENTION

The present invention is generally related to an optical limiter, and, more particularly, is related to nano-graphene based broadband optical limiters with tunable dynamic and spectral responses ranging from the ultraviolet to the infrared, methods of fabricating same, and applications of same.

BACKGROUND OF THE INVENTION

As lasers become more powerful, the need for protection becomes greater. Accidental discharges or their use as a weapon makes protection from them an increasing necessity. Just as the bulletproof vest significantly decreased fatalities from guns, laser proof armor may decrease injuries or deaths because of lasers. Damage to human eyes and optical sensors can be reduced by the use of optical limiting, with new materials and devices that have a high linear transmission up to a predetermined input energy, above which the nonlinear properties of the materials or devices limit the transmission of light. In past decades, various materials including organic dyes, carbon black suspensions, organometallics, fullerenes, semiconductors, liquid crystals, and nanostructures, were studied as optical limiters [1]. However, for practical applications, there is still no single material or limiting mechanism that can meet the stringent application requirements [2]. For example, $C_{60}$ solutions are benchmark standards for optical limiters at 532 nm; however, they suffer from a low damage threshold and are not a broadband optical limiter. Carbon black (CB) suspensions are benchmark standards for broadband optical limiters. However, they do not work well for short pulses such as picosecond pulses. They present a turnover behavior at a 10-Hz repetition rate in some solvents with relatively high viscosities [3, 4] and lose stability over time due to carbon particle aggregation.

Therefore, a heretofore unaddressed need exists in the art to address the aforementioned deficiencies and inadequacies.

SUMMARY OF THE INVENTION

In one aspect of the present invention, a broadband optical limiter characterized with an optical limiting response includes a plurality of graphene nano-sheets (GS), and a base material in which the plurality of graphene nano-sheets is distributed, where a limiting strength of the optical limiting response decreases as a wavelength of an incident light increases. In one embodiment, each of the plurality of graphene nano-sheets has lateral dimensions of about 200 nm by 300 nm, and a thickness of about 1 nm.

In one embodiment, the broadband optical limiter also includes graphene oxide (GO). In another embodiment, the broadband optical limiter may also include gold (Au) nanoparticles.

The broadband optical limiter has a limiting threshold such that when an input fluence of the incident light is equal to or greater than the limiting threshold, the limiting strength of the optical limiting response is substantially stronger than that when the input fluence of the incident light is less than the limiting threshold, where the limiting threshold increases as the wavelength of an incident light increases.

In one embodiment, the optical limiting response is controllable by varying the viscosity and polarity of the organic solvent.

In another embodiment, the optical limiting response is controllable by changing at least one of graphene sizes, π conjugation and degrees of chemical functionalization.

In yet another embodiment, the optical limiting response is controllable by forming composites with optical limiting materials including gold nanoparticles.

In a further embodiment, the optical limiting response is controllable by introducing species into graphene 2D network, and wherein the species includes epoxide, hydroxyl, carbonyl and carboxyl groups.

The optical limiting response exists from UV to IR wavelengths independently.

In one embodiment, the base material is a liquid, wherein the liquid comprises water and a solution of a reagent dissolved in a buffer.

In another embodiment, the base material is a polymer gel matrix, wherein the polymer gel matrix comprises a poly (vinyl alcohol) gel.

In one embodiment, the broadband optical limiter is dispersed in an organic solvent.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention.

DETAILED DESCRIPTION OF THE INVENTION

Figure 1:
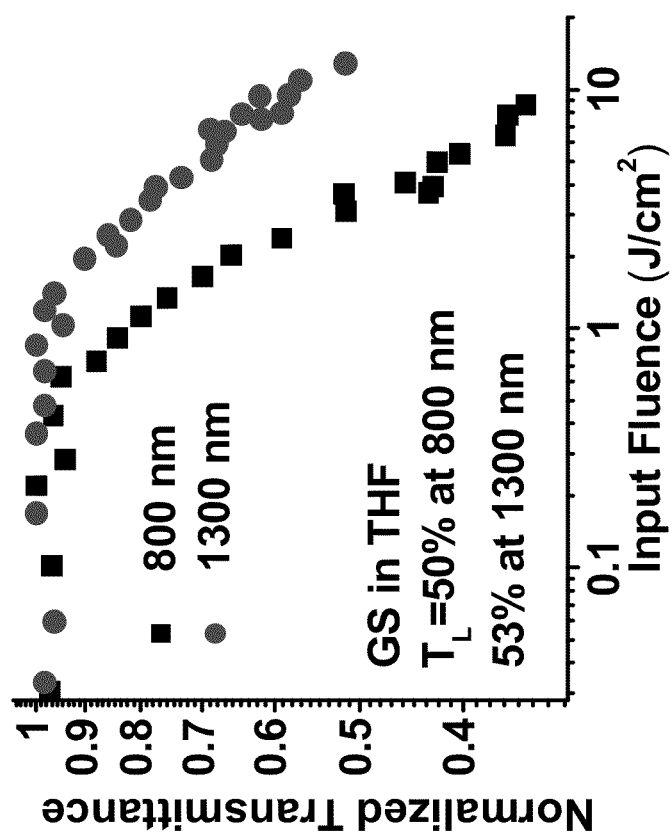
FIG. 1 shows optical limiting responses of a GS suspension in THF at 800 nm and 1300 nm. The normalized transmittance was measured as a function of input fluence.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. The use of examples anywhere in this specification, including examples of any terms discussed herein, is illustrative only, and in no way limits the scope and meaning of the invention or of any exemplified term. Likewise, the invention is not limited to various embodiments given in this specification.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising," "including," "having," "containing," "involving," and the like are to be understood to be open-ended, i.e., to mean including but not limited to.

The description will be made as to the embodiments of the present invention in conjunction with the accompanying drawings in FIGS. 1-4. In accordance with the purposes of this disclosure, as embodied and broadly described herein, this disclosure, in one aspect, relates to a nano-graphene based broadband optical limiter with tunable dynamic and spectral responses ranging from the ultraviolet to the infrared and applications of same.

According to the present invention, a low-cost, nano-graphene based broadband optical limiter with limiting properties superior to current standards, carbon fullerenes ($C_{60}$) solutions and CB suspensions is disclosed. The presence of π conjugation improves the optical limiting responses. Superior limiting performance of graphene is retained regardless of solvent viscosity and polarity, a unique feature not observed in $C_{60}$ and CB. Graphene suspensions in organic solvents can work under 10 Hz laser pulses without losing the excellent limiting performance. No turnover behaviors are observed in graphene and graphene oxide aqueous suspensions. The outstanding limiting properties are also preserved in a gel matrix. These graphene-based optical limiters can work in solutions and solid matrixes for devices used for protecting human eyes and optical sensors from high power lasers.

The broadband optical limiter, in one embodiment, includes a plurality of graphene nano-sheets, and a base material in which the plurality of graphene nano-sheets is distributed. Each of the plurality of graphene nano-sheets has lateral dimensions of about 200 nm by 300 nm, and a thickness of about 1 nm.

In one embodiment, the broadband optical limiter also includes graphene oxide. In another embodiment, the broadband optical limiter may also include gold nanoparticles.

The broadband optical limiter is characterized with an optical limiting response, where a limiting strength of the optical limiting response decreases as a wavelength of an incident light increases. Additionally, the broadband optical limiter has a limiting threshold such that when an input fluence of the incident light is equal to or greater than the limiting threshold, the limiting strength of the optical limiting response is substantially stronger than that when the input fluence of the incident light is less than the limiting threshold, where the limiting threshold increases as the wavelength of an incident light increases.

The base material can be liquid or solid matrix. The liquid comprises water and a solution of a reagent dissolved in a buffer. The reagent includes, but not limited to, dsDNA. The buffer includes, for example, Tris.

The broadband optical limiter is sonicated at a temperature about 80° C. so that the dsDNA is unzipped, and the unzipped DNA is coated on the plurality of graphene nano-sheets.

The broadband optical limiter is dispersible in aqueous, organic solvents and gels. In one embodiment, the broadband optical limiter is dispersed in an organic solvent. The organic solvent includes ACN, THF, DMF, or a mixture of DMF and $CS_2$ with the volume ratio of DMF to $CS_2$ about 1:1. In another embodiment, the broadband optical limiter is dispersed in a PVA gel.

The broadband optical limiter and its fabricating method are described in detail in U.S. patent application Ser. No. 12/766,309, filed Apr. 23, 2010, entitled "Broadband Optical Limiter Based on Nano-Graphene and Method of Fabricating Same," by W. Zhao et al., which is incorporated herein in its entirety by reference.

Without intent to limit the scope of the invention, the broadband optical limiter is further characterized below, with (1) broadband optical limiting responses of graphene nanosheets (GS) at new wavelengths of 800 nm and 1300 nm, (2) optical limiting response of graphene oxide (GO) in aqueous solution and polyvinyl alcohol (PVA) gel and comparison of two photon absorption (TPA) coefficients of GS and GO using equation 1 in this update, and (3) absorption spectra changes of gold nanoparticles-GS composite (Au-GS) after laser irradiation due to laser photothermal reshaping.

Broadband Optical Limiting Responses of GS at 800 nm and 1300 nm: One of unique optical features of GS is its broad linear optical absorption extending from UV to IR [5]. It is expected its limiting behaviors will also be observed in other wavelengths in addition to 532 nm and 730 nm, as a broadband limiter. To further study that, the optical limiting responses of a GS suspension in THF were measured using 800 nm and 1300 nm laser beams, demonstrating broadband limiting properties of GS as shown in FIG. 1. Compared with laser wavelength at 532 nm where a limiting threshold of 1.2 J/cm$^2$ was determined (0.097 mJ in Table 1 of U.S. patent application Ser. No. 12/766,309), the limiting strength of GS decreases at longer wavelengths, with a limiting threshold 3.4 J/cm$^2$ at 800 nm and 13 J/cm$^2$ at 1300 nm, in consistent with observations in other carbon-based broadband limiting materials [6] and semiconducting nanoparticles [7].

Figure 2:
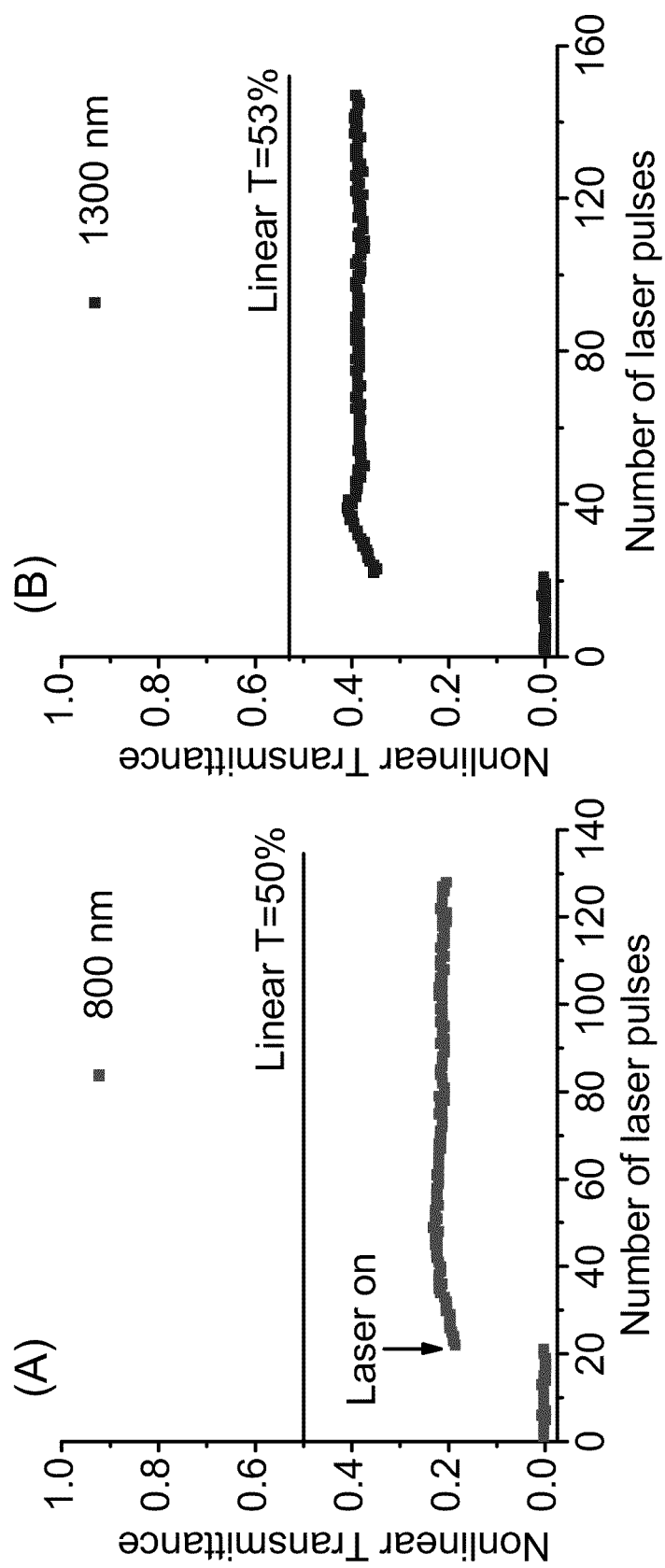
FIG. 2 shows optical limiting responses of GS in a THF suspension at (A) 800 nm and (B) 1300 nm. The nonlinear transmittance was measured as a function of number of laser pulses (2.8 mJ, 10 Hz).

In addition, at 800 nm and 1300 nm under 10 Hz repetitive pulses, the GS suspension also shows stable limiting performance without bleaching (FIG. 2). As shown in FIG. 2, the first dozens of shots near zero transmittance indicate the baseline by blocking laser beam off the sample. A jump in transmittance occurs when the laser beam is on the sample. Limiting takes place in the organic solvent fairly well under continuing 10 Hz pulse shots at 800 and 1300 nm, with constant nonlinear transmittance. This performance was similar to that observed at 532 nm as shown in FIG. 8 in U.S. patent application Ser. No. 12/766,309.

Optical Limiting Responses of GO in Aqueous Solution and PVA Gel: The gel matrix provides several advantages over liquids or solids. First, it contains over 90 wt % of water, but possesses clear, glass-transparent, solid-like structure, making the dopant stable in the matrix over a long period of time without precipitation, while also maintaining an optical limiting environment similar to liquids. Second, the laser damage threshold of the gel may be greater than that of a solid polymer matrix, approaching that of the liquid suspension. Third, the gel matrix can become a fluid at temperatures 60-80° C., allowing for reshaping the gel or re-homogenizing the dopant, important features for recoverable and reusable devices.

Figure 3:
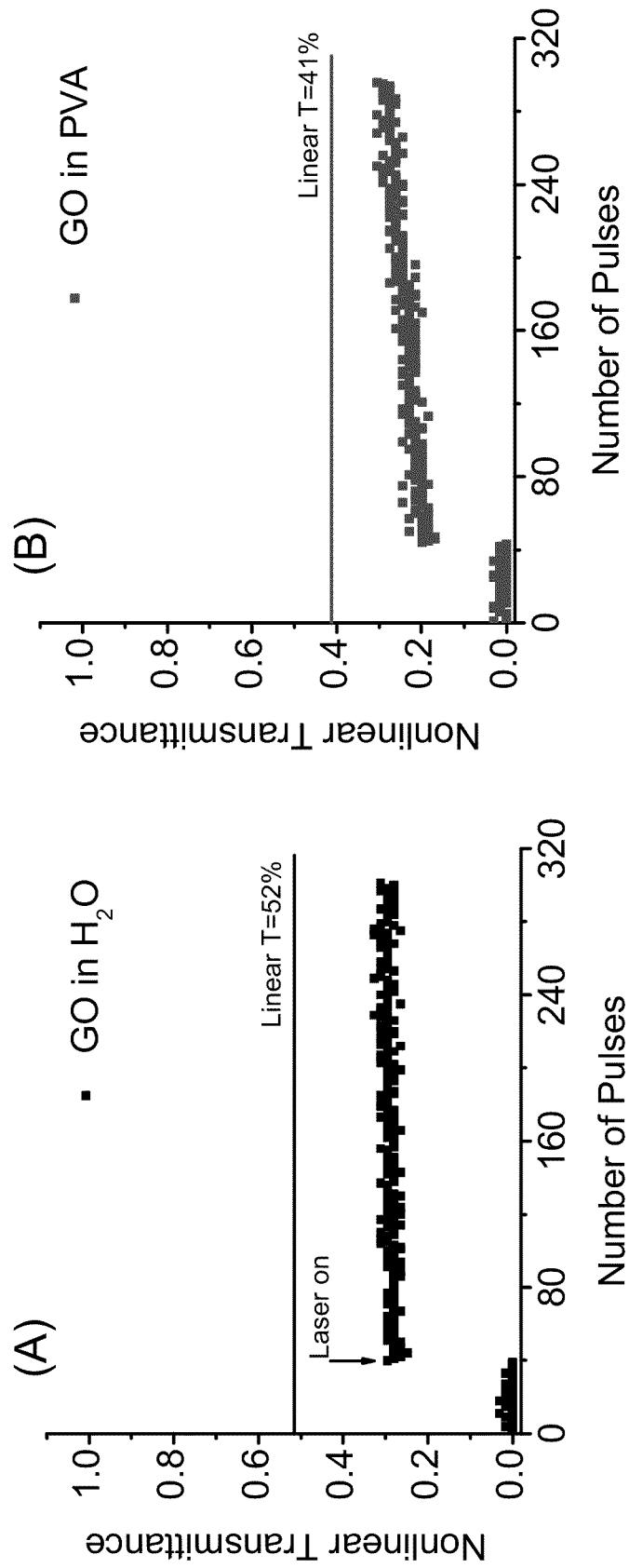
FIG. 3 shows comparison of optical limiting responses of GO in a polymer gel matrix PVA (B) with an aqueous GO suspension (A) at 532 nm. The nonlinear transmittance was measured as a function of number of laser pulses (0.78 mJ, 10 Hz).

As shown in FIG. 3, the GO shows good limiting performance without bleaching that occurs in aqueous GS suspension, and similar limiting performance of GO is kept in the gel matrix as well. However, for GS in water and PVA gel, the limiting goes well for the first few shots, bleaching and subsequent loss of limiting occur under continuing shots. As estimated from the two photon absorption (TPA) coefficients, GO has a coefficient of about 2.8 cm/GW and GS about 7.1 cm/GW, respectively. The coefficients were fitted from the data in FIG. 4 of U.S. patent application Ser. No. 12/766,309, by using equation 1 for a laser beam with a Gaussian spatial and temporal profile in conjunction with linear absorption [8].

$$I_o = \frac{I_i e^{-\alpha L}}{1 + (1 - e^{-\alpha L}) \beta I_i / 2\sqrt{2}\, \alpha} \quad (1)$$

where α is the linear absorption coefficient, β is the TPA coefficient, L is the pathlength, and $I_i$ and $I_o$ are the input power and the out power, respectively. The sample surface reflection is neglected in the equation.

The obtained TPA coefficients based on equation 1 are about two times larger than those obtained by the TPA equation with an incident light beam of a uniform transverse intensity distribution [7, 9, 10], in agreement with the theoretical calculation [10]. So compared GO with GS, GO is about two times weaker than GS at 532 nm from the fitted TPA coefficients but is more robust under 10 Hz repetitive pulses as shown in FIG. 3. For a better limiting device, a compromise may be made by using a composite composed of GO and GS.

Figure 4:
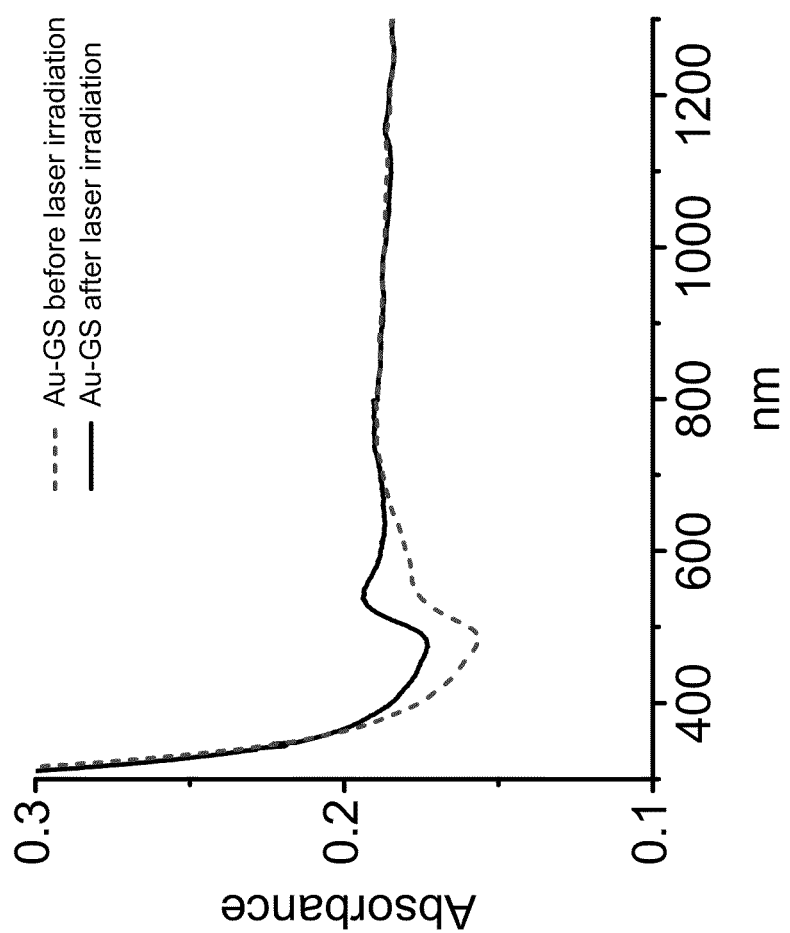
FIG. 4 shows absorption spectra of an Au-GS suspension before and after laser irradiation.

Absorption Spectra Changes of Au-GS Before and After Laser Irradiation: As shown in FIG. 4, the absorbance near 532 nm for Au-GS increased after laser irradiation, indicating that the laser broke down the Au nanoparticles into smaller sizes due to laser photothermal reshaping, thus enhancing absorption effects at 532 nm [11]. There is a possibility that these Au nanoparticles in smaller sizes may re-aggregate, forming larger nanoparticles again, thus showing reversible and recoverable absorption spectra. This may lead to new optical limiting devices.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. For example, multiple probes may be utilized at the same time to practice the present invention. Accordingly, the scope of the present invention is defined by the appended claims rather than the foregoing description and the exemplary embodiments described therein.

REFERENCE LIST

[1] Y.-P. Sun, J. E. Riggs, *Inter. Rev. Phys. Chem.* 18 (1999) 43-90. Organic and Inorganic Optical Limiting Materials. From Fullerenes to Nanoparticles.

[2] G. L. Wood, A. G. Mott, E. J. Sharp, *Proc. SPIE* 1692 (1992) 2-14. Materials Requirements for Optical Limiting.

[3] K. Mansour, M. J. Soileau, E. W. Van Stryland, *J. Opt. Soc. Am. B* 9 (1992) 1100-1109. Nonlinear Optical Properties of Carbon-Black Suspensions (Ink).

[4] F. E. Hernandez, W. Shensky, III, I. Cohanoschi, D. J. Hagan, E. W. Van Stryland, *Appl. Opt.* 41 (2002) 1103-1107. Viscosity Dependence of Optical Limiting in Carbon Black Suspensions.

[5] Nair, R. R., Blake, Grigorenko, A. N., Novoselov, K. S., Booth, T. J., Stauber, T., Peres, N. M. R., Geim, A. K. *Science* 2008, 320, 1308. Fine Structure Constant Defines Visual Transparency of Graphene.

[6] Wang, J., Hernandez, Y., Lotya, M., Coleman, J. N., Blau, W. *J. Adv. Mater.* 2009, 21, 2430-2435. Broadband Nonlinear Optical Response of Graphene Dispersions.

[7] Li, Q., Liu, C., Liu, Z., Gong, Q. *Opt. Exp.* 2005, 13, 1833-38. Broadband Optical Limiting and Two-photon Absorption Properties of Colloidal GaAs Nanocrystals.

[8] Boggess, Jr. T. F., Bohnert, K. M., Mansour, K., Moss, S. C., Boyd, I. W., Smirl, A. L. *IEEE J. Quantum Electron.* 1986, 22, 360-368. Simultaneous Measurement of the 2-Photon Coefficient and Free-Carrier Cross-Section above the Bandgap of Crystalline Silicon.

[9] Wood, G. L., Mott, A. G., Sharp, E. J. *Proc. SPIE* 1992, 1692, 2-14. Materials Requirements for Optical Limiting.

[10] He, G. S., Tan, L.-S., Zheng, Q., Prasad, P. N. *Chem. Rev.* 2008, 108, 1245-1330. Multiphoton Absorbing Materials: Molecular Designs, Characterizations, and Applications.

[11] El-Sayed M. A. *Acc. Chem. Res.* 2001, 34, 257-264. Some Interesting Properties of Metals Confined in Time and Nanometer Space of Different Shapes.

What is claimed is:

1. A graphene-based broadband optical limiter, comprising:
   a graphene suspension, comprising:
   (a) a plurality of graphene nano-sheets, comprising aggregated gold nanoparticles; and
   (b) a base material in which the plurality of graphene nano-sheets is suspended,
   wherein the base material is a polymer gel matrix,
   wherein the graphene-based broadband optical limiter is characterized with an optical limiting response of an absorbance greater than about 0.15, and a limiting strength of the optical limiting response decreases as a wavelength of an incident light increases; and
   wherein due to laser photothermal reshaping by performing laser irradiation to the graphene suspension, the aggregated gold nanoparticles are broken down into smaller sizes to form re-aggregatable gold nanoparticles, such that the graphene suspension has enhanced absorption effects at about 532 nm and reversible and recoverable absorption properties due to the breaking down of the aggregated gold nanoparticles and re-aggregation of the re-aggregatable gold nanoparticles.

2. The graphene-based broadband optical limiter of claim 1, having a limiting threshold such that when an input fluence of the incident light is equal to or greater than the limiting threshold, the limiting strength of the optical limiting response is substantially stronger than that when the input fluence of the incident light is less than the limiting threshold, wherein the limiting threshold increases as the wavelength of an incident light increases.

3. The graphene-based broadband optical limiter of claim 2, wherein the optical limiting response is characterized with a normalized transmittance as a function of the input fluence of the incident light, wherein when the input fluence of the incident light is equal to or greater than the limiting threshold, the normalized transmittance decreases nonlinearly as the input fluence increases.

4. The graphene-based broadband optical limiter of claim 1, wherein the optical limiting response is controllable by changing at least one of graphene sizes, $\pi$ conjugation and degrees of chemical functionalization.

5. The graphene-based broadband optical limiter of claim 1, wherein the optical limiting response is controllable by forming composites with optical limiting materials including the gold nanoparticles.

6. The graphene-based broadband optical limiter of claim 1, wherein the optical limiting response is controllable by introducing species into graphene 2D network, and wherein the species includes epoxide, hydroxyl, carbonyl and carboxyl groups.

7. The graphene-based broadband optical limiter of claim 1, wherein the optical limiting response exists from UV to IR wavelengths independently.

8. The graphene-based broadband optical limiter of claim 1, wherein each of the plurality of graphene nano-sheets has lateral dimensions of about 200 nm by 300 nm, and a thickness of about 1 nm.

9. An optical limiting device, comprising the graphene-based broadband optical limiter of claim 1.

10. The graphene-based broadband optical limiter of claim 1, wherein the polymer gel matrix comprises a poly(vinyl alcohol) gel.

11. The graphene-based broadband optical limiter of claim 1, being dispersed in an organic solvent.

12. The graphene-based broadband optical limiter of claim 11, wherein the optical limiting response is controllable by varying the viscosity and polarity of the organic solvent.

* * * * *